(12) United States Patent
Gunnarsson et al.

(10) Patent No.: US 10,310,126 B2
(45) Date of Patent: Jun. 4, 2019

(54) SYSTEM AND METHOD FOR SEA BED SURVEYING

(71) Applicant: SUBVISION AB, Dösjebro (SE)

(72) Inventors: Per Gunnarsson, Löddeköpinge (SE); Olle Kröling, Kävling (SE)

(73) Assignee: Subvision AB, Dösjebro (SE)

( * ) Notice: Subject to any disclaimer, the term of this patent is extended or adjusted under 35 U.S.C. 154(b) by 0 days.

(21) Appl. No.: 15/531,765

(22) PCT Filed: Dec. 1, 2014

(86) PCT No.: PCT/SE2014/051428
§ 371 (c)(1),
(2) Date: May 31, 2017

(87) PCT Pub. No.: WO2016/089258
PCT Pub. Date: Jun. 9, 2016

(65) Prior Publication Data
US 2017/0261629 A1    Sep. 14, 2017

(51) Int. Cl.
*G01V 1/38*     (2006.01)
*G01V 11/00*    (2006.01)
*G01V 3/15*     (2006.01)
*G01V 3/08*     (2006.01)

(52) U.S. Cl.
CPC .......... *G01V 1/3817* (2013.01); *G01V 1/3826* (2013.01); *G01V 3/081* (2013.01); *G01V 3/15* (2013.01); *G01V 11/00* (2013.01)

(58) Field of Classification Search
CPC ...... G01V 1/3817; G01V 3/15; G01V 1/3826; G01V 11/00; G01V 3/081
See application file for complete search history.

(56) References Cited

U.S. PATENT DOCUMENTS 6,009,042 A * 12/1999 Workman ............ G01V 1/3808
                                                          114/244
6,456,565 B1 * 9/2002 Grall ...................... G01V 1/201
                                                          367/17
9,176,254 B2 * 11/2015 Johnstad ................ G01V 1/201
(Continued)

FOREIGN PATENT DOCUMENTS

CA    2588062 A1 *  5/2006
EP    0525391 A1    2/1993
(Continued)

OTHER PUBLICATIONS

International Search Report for corresponding PCT/SE2014/051428, dated Aug. 31, 2015.
(Continued)

*Primary Examiner* — Ian J Lobo
(74) *Attorney, Agent, or Firm* — Sandberg Phoenix & von Gontard, P.C.

(57) ABSTRACT

A sea bed survey system being configured to be towed by a towing body (12) is provided. The system comprises at least one sensor carrier (100) having a plurality of sensors (128) disposed along its length, and at least one deflector (110) for controlling the lateral extension and the vertical position of said sensor carrier (100), wherein the lateral extension exceeds 25% of the length of sensor carrier, and the vertical height above the sea bed is less than the lateral extension of said sensor carrier.

20 Claims, 6 Drawing Sheets

(56) References Cited

U.S. PATENT DOCUMENTS

| | | | |
|---|---|---|---|
| 2006/0176774 A1 | 8/2006 | Toennessen | |
| 2007/0019504 A1* | 1/2007 | Howlid | G01V 1/3826 |
| | | | 367/16 |
| 2009/0092006 A1 | 4/2009 | Teigen et al. | |
| 2010/0002536 A1 | 1/2010 | Brewer et al. | |
| 2010/0045295 A1 | 2/2010 | Mittet et al. | |
| 2011/0305106 A1 | 12/2011 | Eick et al. | |
| 2013/0025362 A1* | 1/2013 | Sudow | G01V 1/3808 |
| | | | 73/170.33 |
| 2013/0030709 A1* | 1/2013 | Ferber | G01V 1/36 |
| | | | 702/16 |
| 2013/0272090 A1 | 10/2013 | Peppe et al. | |
| 2014/0233350 A1 | 8/2014 | Stokkeland et al. | |

FOREIGN PATENT DOCUMENTS

| | | |
|---|---|---|
| GB | 2424950 A | 10/2006 |
| GB | 2443843 A | 5/2008 |
| GB | 2477148 | 7/2011 |
| GB | 2492642 A | 1/2013 |
| GB | 2493258 A | 1/2013 |
| WO | 2007006785 A2 | 1/2007 |

OTHER PUBLICATIONS

Written Opinion for corresponding PCT/SE2014/051428, dated Aug. 31, 2015.
Extended European Search Report from corresponding Application EP14907567.3, dated Jan. 14, 2019.

\* cited by examiner

SYSTEM AND METHOD FOR SEA BED SURVEYING

CROSS-REFERENCE TO RELATED APPLICATIONS

This application is the US National Stage under 35 U.S.C. § 371 of International App. No. PCT/SE2014/051428 filed on Dec. 1, 2014, which is incorporated herein by reference.

TECHNICAL FIELD

The present invention relates to a system and a method for survey of the ocean bed and the near region below the ocean bed. More particularly, the present invention relates to a system and method utilizing one or more towable structures in the form of sensor carriers having a plurality of sensors.

BACKGROUND

One consequence of the two last world wars is that a large number of UXO's (unexploded ordnance) such as bombs, shells, grenades and mines still resides on the bottom or are buried in the bottom sediment. Deliberate dumping of chemical warfare weapons in the sea has also been performed during post war time. For example, it is estimated that more than 100.000 mines have been laid j in the Baltic Sea, of which approximately 30.000 have been disarmed so far. Hence still 70.000 mines are present which may cause severe damages during cable or pipeline installations or oil/gas production, etc.

Chemical weapons pose an environmental threat and can also be of great danger when caught in fishing nets. Thus, it is often necessary to perform accurate and high resolution surveying of the ocean bed, and the near region below the ocean bed, before any other underwater work or construction is done.

One commonly used method to search for UXO's or other objects with ferromagnetic signatures is to use one or several magnetometers that is either towed behind a survey vessel or mounted on a Remotely Operated Vehicle (ROV) which is operated from the survey vessel. Currently used methods use rather few magnetometers giving poor bottom coverage and ROVs when used are rather slow and have a limited lateral coverage. This makes surveying very time consuming and, since, survey vessels are expensive to operate there is a need for an improved system and method to decrease survey times.

SUMMARY

In view of the above mentioned drawbacks of prior art systems it is an object of the present invention to provide a solution solving this problem.

The main idea of the present invention is to use one or several towable structures in the form of a sensor carrier, which is extended in length in one dimension, and has a plurality of sensors, such as magnetometers, mounted on it. By arranging the sensor carriers such that they experience a lateral extension relative to the survey direction, the sensor carriers and hence the sensors will cover a large lateral distance relative to the survey direction. This will increase the area that can be surveyed at the same time. The lateral coverage is determined by the length of the sensor carriers and the lateral force on the sensor carrier relative to the survey direction. Since the sensor carrier may be flexible the angle relative to the survey direction will in most cases not be the same along the length of the sensor carrier. The sensors have to be placed close enough to achieve the desired measurement resolution. Since the angle relative to the survey direction is not constant, the distance between adjacent sensors can be made different to compensate for this to make lateral distance between sensors equal.

Before turning to the various aspects of the present invention, some terms will be explained and their definition will be given.

Sea bed: The sea bed is defined as a region limited by an upper boundary above which mainly sea water exists. The sea bed contains, apart from water, organic material, minerals, and other materials that are denser than water. The sea bed may contain man-made material dumped at sea. Objects buried in the sea bed are generally not visible. Throughout this specification, it is assumed that the sea bed extends no more than 100 m below the upper limiting boundary surface.

Sensor carrier: The sensor carrier is an extended structure capable of handling mechanical strain in its main length axis direction, strong enough to tow deflectors needed for lateral coverage, at the required survey speed. The sensor carrier may be stiff, or partly flexible enabling it to be folded at certain locations along its length during storage and transportation. The sensor carrier may also be implemented as a fully flexible structure that can be rolled during storage. It can have a circular cross-section or a streamlined cross-section for reduced drag. A non-rigid or semi-rigid sensor carrier may be fitted with sensors spaced apart such that sensors become evenly spaced laterally when the sensor carrier is towed through water.

Deflector: A deflector is a device designed for the purpose of generating lateral horizontal and/or vertical forces as the deflector is towed through water. The deflector may be either fixed or controllable vertically and laterally, either manually or remotely.

Underwater towed system: The underwater towed system comprises all parts mechanically connected behind a towing body, which are needed to operate the sensor carrier under water. The underwater towed system thus comprises at least one sensor carrier fitted with one or several integrated or separately attached deflector(s), in such a way that the lateral extension of the sensor carrier exceeds e.g. 25% of the total length of the sensor carrier, when the underwater towed system is towed in water. The towed system may also include, but is not limited to, electrical connection boxes, underwater housings, electrical cables, underwater connectors, front-end depressors, weights, floats, vibration absorbers, stretch sections, wires, ropes, surface buoys, shackles, externally mounted sensors and transponders for positioning, bottom lighting system, warning lights etc.

Towing Body: A towing body is a moveable construction, such as a surface ship, drone, helicopter, hovercraft, torpedo, ROTV, ROV, AROV, scientific towed equipment, military towed equipment, or other surface-, air- or underwater body. The towing body is capable of applying a towing force directly or indirectly to an underwater towed system.

TDEM: TDEM (time domain electromagnetic surveying) is an active method where transmitted electromagnetic pulses induce decaying eddy currents in electrically conducting objects. The induced eddy currents generate secondary magnetic fields detectable after the transmitted electromagnetic pulse has been transmitted. The presence or the temporal variation in strength of this signal provides information about the sea bed and therein located electrically conducting objects.

INS: INS (inertial navigation system) is a computer-based navigation system that uses sensors to determine the position, orientation, and velocity of a moving object, such as a sensor carrier or components thereof.

Motion reference unit: Information from a plurality of sensors is used to calculate a position and attitude. A motion reference unit may contain laser gyros, mechanical gyros, accelerometers, magnetic compasses, inclinometers, rate gyros, and it may use external input from GPS, or underwater positioning systems, supplying approximate positions in a geographically referenced coordinate system. The output of the motion reference unit will in most cases provide filtered output data with higher accuracy than the input data.

Hydrodynamic fairing: Hydrodynamic fairing is a device, or structure, used to reduce drag and vibrations of a towed body, such as a sensor carrier. The fairing may e.g. be implemented using a multitude of threads attached to the towed body.

Altitude control: Altitude control is a method to actively steer a certain location of an underwater towed system to a desired height above the bottom.

Depth control: Depth control is a method to actively steer a certain location of an underwater towed system to a desired depth below the sea surface.

According to a first aspect of the invention there is provided a sea bed survey system being configured to be towed by a towing body. The system comprises at least one sensor carrier having a plurality of sensors disposed along its length, and at least one deflector for controlling the lateral extension and the vertical position of the sensor carrier. The lateral extension exceeds 25% of the length of sensor carrier, and the vertical height above the sea bed is less than the lateral extension of the sensor carrier.

In an embodiment of the invention at least one sensor carrier further comprises one or more acoustic transponders or acoustic responders for positioning the sensor carrier.

In another embodiment the system further comprises at least one motion reference unit for determining the position of one or more points on the sensor carrier.

In yet another embodiment the motion reference unit is selected from the group comprising: a combined inertial navigation sensor, accelerometers, rotating gyros, vibrational gyros, laser gyros, Doppler logs, and/or inclinometers.

In a further embodiment one or more of the sensors of the sensor carrier are configured to provide data associated with the shape of the sensor carrier. The respective position of the sensors in Geo-referenced coordinates is determined based on at least one known position in Geo-referenced coordinate, and the relative position of the sensor within the sensor carrier.

In an alternative embodiment the sensors providing data associated with the shape of the sensor carrier are selected from the group comprising heading sensors, depth sensors, inclinometers, or sensors measuring the curvature of the sensor carrier.

The system may in an embodiment further comprise a control unit configured to control the altitude above the sea bed of the sensor carrier at one or more locations along the length of the sensor carrier. The control unit is further configured to apply vertical steering forces to the sensor carrier.

In another embodiment the vertical steering forces are generated by at least one steerable rudder or by a change in buoyancy of the deflector.

In yet another embodiment the system further comprises means for controlling the altitude of the sensor carrier above the sea bed, or depth of the sensor carrier below the sea surface.

Further, in another embodiment the means for controlling the altitude or depth of the sensor carrier comprises a winch configured to adjust the vertical distance between the towing body and a towing point on the sensor carrier.

In an alternative embodiment the control unit is configured to allow one or more locations of the sensor carrier to be controlled to automatically maintain a constant vertical offset relative to a reference point of the system, using depth information derived from water pressure sensors or by measuring the distance to sea surface using echo-sounding, or by measuring sensor carrier tilt angle relative to the horizontal plane using libels or accelerometers.

In an embodiment the vertical position of the sensor carrier is controlled by adjusting the survey speed through the water.

In an alternative embodiment the deflector is arranged at a first end of the sensor carrier being opposite the towing point arranged at a second end of the sensor carrier, and the second end of the sensor carrier is towed directly or indirectly by said towing body.

The system may in an alternative embodiment further comprise deflecting surfaces for generating lateral forces on the sensor carrier, wherein the deflecting surfaces are distributed in a plurality of locations along the sensor carrier.

The system may in another embodiment comprise means for applying lateral forces directly or indirectly to one or more locations on the sensor carrier, thus enabling horizontal steering.

In an alternative embodiment of the invention the sensor carrier comprises a flexible structure with two or more strain members separated vertically using spacers, making the sensor carrier resist rotational movement in its main axis, due to the curvature of the sensor carrier caused by hydrodynamic drag as it is towed though water.

In yet another alternative embodiment two sensor carriers are connected directly or indirectly in their respective tail end with a rope or wire, effectively determining the lateral extent of the towed sensor carriers.

In an embodiment at least one electrical conductor is located in each sensor carrier, and at least one electrical conductor is connecting the respective tail ends of the sensor carriers, forming a large area triangular shaped loop suitable for creating electromagnetic fields for use in time domain electromagnetic surveying.

In another embodiment the system further comprises at least one electrode configured to transmit an electrical current through the surrounding water and bottom substrata.

In yet another embodiment at least one electrode is mounted directly or indirectly onto the sensor carrier and/or the towing cable and/or the towing body.

In an alternative embodiment the sensors are configured to measure magnetic field in vector form, or the absolute magnitude of the magnetic field, or its gradients in one or more axes.

In an embodiment of the invention the sensors are configured to measure acoustic pressure, acoustic particle velocity, or particle acceleration.

In another embodiment of the invention the sensors are electrodes measuring electrical-field or its gradients.

In one embodiment the sensors may be temperature sensors, and in yet another embodiment the sensors may be chemical sensors.

Further, in another embodiment the sensors comprise active sensors transmitting electromagnetic energy, light, or acoustic energy, and/or measuring returned energy or time-of-flight.

In an embodiment of the invention the sensors are selected from the group comprising multibeam echosounders, single beam echsounders, acoustic sidescanners, sub bottom profilers, boomers, sparkers, laser range finders, laser scanners, cameras, and/or systems measuring resistivity.

In another embodiment the sensors comprise tilt sensors configured to measure tilt in two or more axes for determining changes in other non-tilt sensors orientation relative to the gravitational vector. Thus, the provision of tilt sensors allows for compensation of predetermined or adaptively determined errors in other non-tilt sensor output or in other non-tilt sensor derived signals.

In yet another embodiment the sensors comprise a plurality of cameras, and a plurality of light sources arranged at a distance from the cameras, for improving visibility in turbid water.

Further, in yet another embodiment the sensors are connected to optical fibers for transmitting measured data in order to reduce EMC problems resulting in cross-feed into sensors.

In an embodiment the sensors are optical fiber sensors in order to reduce EMC problems resulting in cross-feed into sensors.

In an alternative embodiment electrical power and signals are distributed in balanced pairs using galvanic isolation in order to reduce EMC problems resulting in cross-feed into sensors, and in particular reducing magnetic fields.

In yet another alternative embodiment electrical power and signals are distributed using frequencies outside the bandwidth of the used sensors, for the purpose of reducing cross-feed into sensor signals, caused by electrically self generated noise within the system.

According to a second aspect of the invention there is provided a sea bed survey system being configured to be towed by a towing body. The sea bed survey system comprises at least one sensor carrier having a plurality of sensors disposed along its length, and at least one deflector for controlling the lateral extension as well as the vertical position of the sensor carrier. The system further comprises a control unit configured to receive sensor data as well as position data and to associate specific sensor data with a specific position of the sea bed.

In an embodiment of the invention the sensor carrier is provided with at least one connector for connecting the sensor carrier to a towing cable of a towing body.

In another embodiment the sensors comprise magnetic sensors.

In yet another embodiment the magnetic sensors are 3-axis fluxgate sensors.

In an alternative embodiment the sensors further comprise 3-axis accelerometers.

According to an embodiment of the system each sensor carrier is divided into two or more sections. Each section comprises a plurality of sensors, and wherein each section is further provided with at least one water pressure sensor configured to provide depth information and/or at least one echo-sounding sensor configured to measure the distance to sea surface.

In an embodiment each section further comprises at least one transponder.

In another embodiment the deflector is arranged at the rear end of the sensor carrier.

In yet another embodiment the at least one sensor carrier has a lateral extension relative a survey direction.

In an alternative embodiment at least two sensor carriers extend in a plane being substantially parallel with the sea bed.

In yet another alternative embodiment one of the sensor carriers extends on one side of a longitudinal axis coinciding with a survey direction, and the other one of said sensor carriers extends on the opposite side of the longitudinal axis such that the two sensor carriers form a V-shape.

In an embodiment of the invention the two sensor carriers are connected at a connection point.

In another embodiment the connection point is formed by a deflector, enabling lateral and vertical steering, or by a depressor allowing only vertical steering.

According to a third aspect of the invention there is provided a sea bed survey method. The method comprises the steps of:

towing at least one sensor carrier by means of a towing body, wherein the sensor carrier has a plurality of sensors disposed along its length, and deflecting the lateral extension and the vertical position of said sensor carrier such that the lateral extension exceeds 25% of the length of sensor carrier, and the vertical position above the sea bed is less than the lateral extension of said sensor carrier.

According to a fourth aspect of the invention there is provided a sea bed survey method. The method comprises the steps of:

providing at least one sensor carrier, having a plurality of sensors distributed along its length and at least one deflector for controlling the position of the sensor carrier relative the sea bed as well as relative a longitudinal axis coinciding with a survey direction, arranging said at least one sensor carrier such that the sensor carrier has a lateral extension relative the survey direction, and controlling at least one control unit for receiving sensor data as well as position data, and associating a specific sensor data with a specific position of the sea bed.

BRIEF DESCRIPTION OF DRAWINGS

The above, as well as additional objects, features, and advantages of the present invention, will be better understood through the following illustrative and non-limiting detailed description of preferred embodiments of the present invention, with reference to the appended drawings, wherein.

DETAILED DESCRIPTION

In the following, descriptions of various embodiments of a sea bed survey system will be given. Such systems may be used to map the sea bed in terms of mines, or other undesired obstacles which may be present.

Figure 1:
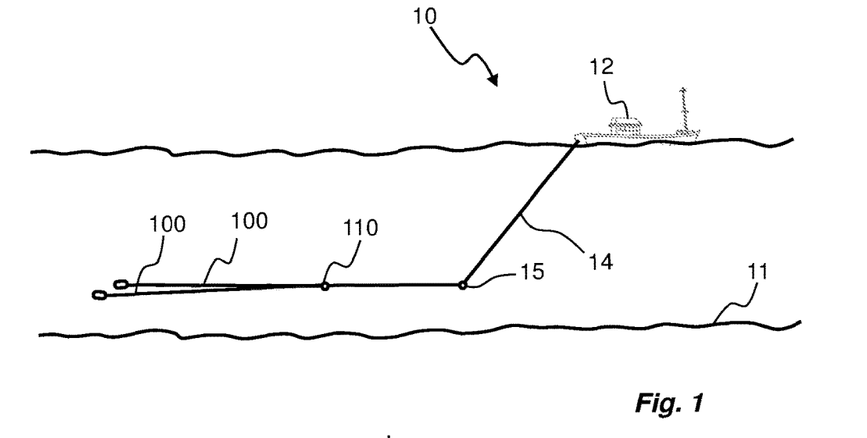
FIG. 1 is a schematic side view of a sea bed survey system according to an embodiment.

A first embodiment of a sea bed survey system 10 is shown in FIG. 1. The sea bed survey system 10 is used by a towing body 12, herein shown as a marine vessel, such as a survey ship. The towing body tows the survey system 10, forming part of an underwater towed system and comprising two sensor carriers 100. The towing body 12 operates at a specific speed along a survey direction, i.e. the forward direction of the towing body 12.

Figure 6:
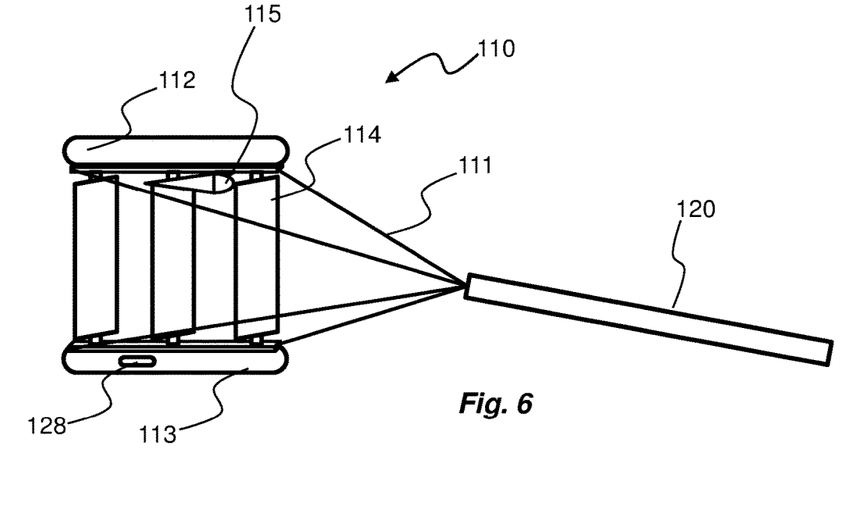
FIG. 6 is an isometric view of a deflector for use with a system according to an embodiment.

The underwater towed system comprises a towing cable 14 that is connected to the towing body 12, and extending from the rear end of the towing body 12 and into the water. One end of the towing cable 14 is connected, directly or indirectly, to the sensor carriers 100, such that the sensor carriers 100 are moving in the survey direction at a specific distance from the towing body 12. The towing cable 14 may be provided with one or several weights 15 at a position somewhere between the towing body 12 and the sensor carriers 100, Preferably, the towing cable 14 is connected to the sensor carriers 100 by means of a deflector or depressor 110. The deflector 110, as will be further described with reference to FIG. 6, is capable of adjusting the depth of the deflector 110, or the distance between the deflector 110 and the ocean bed 11. The deflector 110 is also capable of adjusting the lateral position relative the survey direction. A depressor is normally configured as a deflector 110; however a depressor does not include means for adjusting the lateral position.

The sensor carriers 100 are positioned at a specific distance from the ocean bed 11, and they extend laterally relative a longitudinal axis L coinciding with the survey direction. This is shown in more details in FIG. 2, where the sensor carriers 100 are substantially symmetrically arranged relative the longitudinal axis L.

Figure 2:
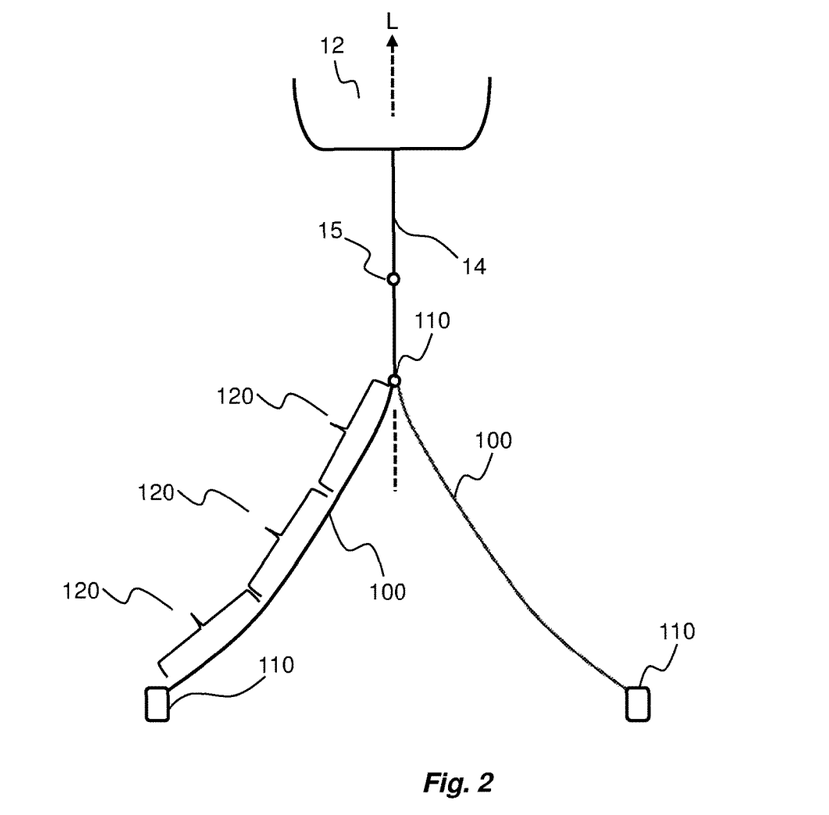
FIG. 2 is a top view of the sea bed survey system shown in FIG. 1.
Figure 3:
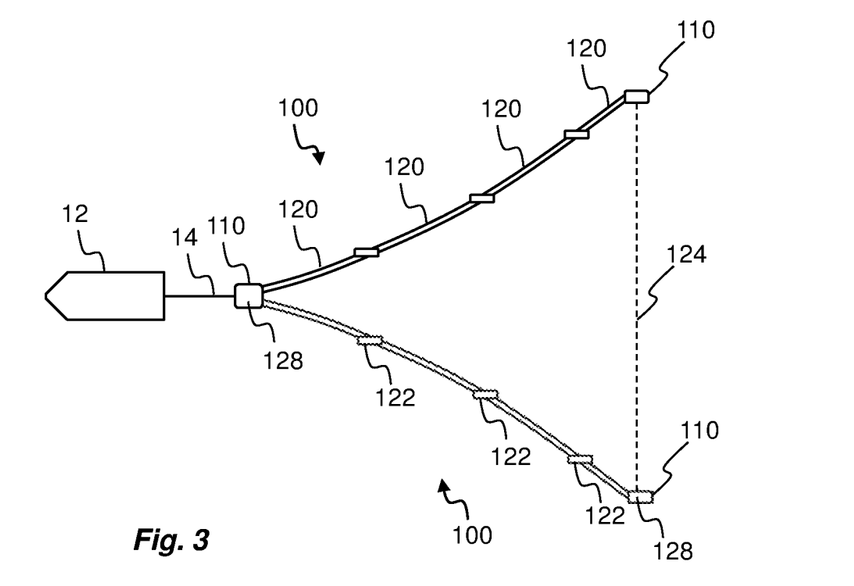
FIG. 3 is a top view of a sea bed survey system according to an embodiment.

As can be seen in FIGS. 2 and 3 the rear end of each sensor carrier 100 is provided with a deflector 110 for controlling the depth, or height above the ocean bed 11, of each sensor carrier 100. Further to this, the deflector 110 is able to control the lateral extension of the sensor carrier 100.

Each sensor carrier 100 is divided into one or more sections 120. Hence, a sensor carrier 100 is formed by such sections 120 arranged in series.

A section 120 extends between two ends, and each end is preferably provided with a connector 122 (see FIG. 3) for connecting the section 120 to an adjacent section 120, or in case of a rear-most section, to the rear deflector 110. The connector 122 may e.g. be a mechanical connector forming a robust connection between two adjacent sections 120. The connector 122 may in other embodiments be a deflector 110.

In FIG. 3 the rearmost deflectors 110 are connected to each other by means of a cable 124, wire or similar in order to limit the maximum lateral extension of the two sensor carriers 100.

The section 120 may have a tubular shape having a circular cross-section. However other shapes are also possible such as rectangular, quadratic, ellipse, wing-shaped, etc. Two different embodiments of a section 120 are shown in FIGS. 4 and 5.

Figure 4:
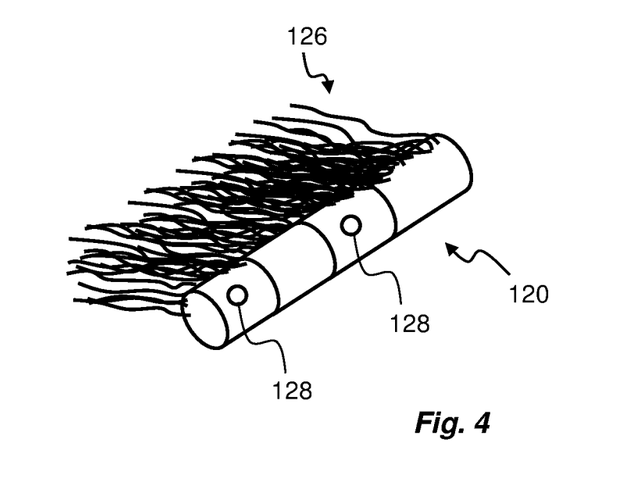
FIG. 4 is an isometric view of a part of a sensor carrier according to an embodiment.

In FIG. 4 a part of a section 120 is shown, wherein the section 120 has a tubular shape. A fairing arrangement 126 is provided at the outer periphery of the tubular body by means of thin filaments which reduce drag and vibrations of the sensor carrier 100. The fairing arrangement 126 may extend along the entire section 120, or it may be provided at only some parts of the section 120.

Figure 5:
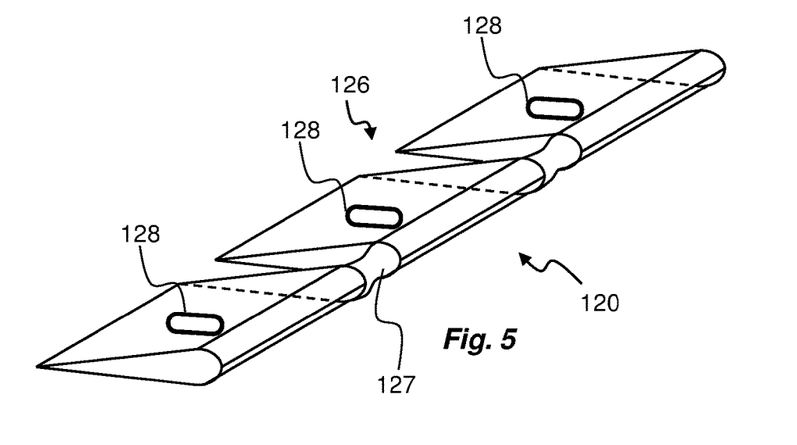
FIG. 5 is an isometric view of a part of a sensor carrier according to a further embodiment.

In FIG. 5 another embodiment of a part of a section 120 is shown, wherein the fairing arrangement 126 is formed by a hard teardrop-shaped shell. Individual wings, or teardrop shells are connected to each other by means of a joint 127, preferably formed by a flexible tube or similar.

Each section 120 is provided with several sensors 128. Again with reference to FIG. 4 the sensors 128 are embedded in the tubular body. With reference to the section 120 shown in FIG. 5 the sensors 128 may be embedded in the hard shell of the fairing arrangement 126, or inside the flexible tube 127.

Hence, a plurality of sensors 128 is arranged along the length of the sensor carrier 100. Sensors 128 may be arranged with an un-equal spacing along the sensor carrier 100, providing approximately constant cross track sensor spacing during towing operation, i.e. when the sensor carriers 100 have a lateral extension.

The sensors 128 are configured to transmit the measured data to a control unit, which will be further described below. The sensors 128 may thus be connected by means of a wire harness extending along the sensor carrier 100. The wire harness may e.g. by used to power the sensors, as well as to transmit the sensor data.

The sensors 128 are preferably configured to measure magnetic field in vector form, or the absolute magnitude of the magnetic field, or its gradients in one or more axis. The sensors 128 may further be configured to measure acoustic pressure, acoustic particle velocity, or particle acceleration.

In one embodiment, the sensors 128 are provided as electrodes measuring electrical-field or its gradients. The sensors 128 may also be temperature sensors and/or chemical sensors.

The sensors 128 may in some embodiments be active sensors transmitting electromagnetic energy, light, or acoustic energy, and/or measuring returned energy or time-of-flight. Such sensors 128 are preferably selected from the group comprising multibeam echosounders, single beam echsounders, acoustic sidescanners, sub bottom profilers, boomers, sparkers, laser range finders, laser scanners, cameras, and/or systems measuring resistivity.

The sensors 128 may in some embodiments be tilt sensors configured to measure tilt in two or more axis for determining changes in other non-tilt sensors orientation relative to the gravitational vector. This allows for compensation of predetermined or adaptively determined errors in other non-tilt sensor output or in other non-tilt sensor derived signals.

The sensors 128 may also include one or more of cameras, and a plurality of light sources arranged at a distance from the cameras for improving visibility in turbid water.

The sensors 128 may thus be used to measure and collect various data of the sea bed. The specific number and combination of sensors 128 is dependent on the particular application; hence a sensor carrier 100 may comprise one or more of the sensor types mentioned above.

The sensors 128 are preferably connected to optical fibers for transmitting measured data in order reduce EMC problems resulting in cross-feed into sensors. More specifically, the sensors 128 may be optical fiber sensors in order reduce EMC problems resulting in cross-feed into the sensors 128.

Alternatively, electrical power and sensor signals are distributed in balanced pairs using galvanic isolation in order to reduce EMC problems resulting in cross-feed into the sensors 128, and in particular reducing magnetic fields. Even more preferred, the electrical power and the sensor signals are distributed using frequencies outside the bandwidth of the used sensors 128, for the purpose of reducing cross-feed into sensor signals, caused by electrically self generated noise within the system.

In order to further improve the robustness and accuracy of the sea bed survey system, the sensor carrier may comprise at least one electrical conductor. At least one further electrical conductor is connecting the respective tail ends of the sensor carriers, thus forming a large area triangular shaped loop suitable for creating electromagnetic fields for use in TDEM.

The sea bed survey system may further comprise at least one electrode configured to transmit an electrical current through the surrounding water and bottom substrata. The electrode is mounted directly or indirectly onto the sensor carrier and/or the towing arrangement and/or the towing body.

So far, the sensors 128 described are used to provide sea bed data. Since the sensor carriers 100 have a lateral extension it is also desirable to associate a specific sensor 128 with its geographic position. For this purpose additional sensors 128 may be provided.

The sensor carrier 100 may for example comprise one or more acoustic transponders or acoustic responders for positioning the sensor carrier 100. Moreover, the sensor carrier 100 may comprise at least one motion reference unit for determining the position of one or more points on the sensor carrier 100. The motion reference unit may be used together with an INS, and the motion reference unit may for example comprise a combined inertial navigation sensor, accelerometers, rotating gyros, vibrational gyros, laser gyros, Doppler logs, and/or inclinometers.

In order to determine the location of the sensors 128 one or more of the sensors 128 is configured to provide data associated with the shape of the sensor carrier 100. The respective position of all sensors in Geo-referenced coordinates can thus be determined based on at least one known position in Geo-referenced coordinate, and the relative position of the sensor within the sensor carrier 100. Such position sensors 128 may e.g. be heading sensors, depth sensors, inclinometers, or sensors measuring the curvature of the sensor carrier.

So far, the sea bed survey system has been described to have sensors collecting data corresponding to the sea bed, as well as sensor associating a particular sensor with its location. Such sensors, associating a particular sensor with its location, may not necessarily be arranged on the sensor carrier 100, but instead such location sensors 128 may be arranged at the front connection joint 110 (see FIG. 3), and/or the rear deflector 110 (see FIG. 3 and FIG. 6).

In order to improve performance of the sea bed survey system it may also be desirable to control the lateral and vertical extension of the sensor carrier(s) 100.

A control unit may be provided and configured to control the altitude above the sea bed of the sensor carrier 100 at one or more locations along the length of the sensor carrier 100, whereby the control unit can be further configured to apply vertical steering forces to the sensor carrier 100. Steering forces may e.g. be generated by steerable rudders or by a change in buoyancy of the deflector 110.

An embodiment of a deflector 110 is shown in FIG. 6. As can be seen in FIG. 6, the deflector 110 is attached to the rear-most section 120 of the sensor carrier 100 by one or more cables 111. The deflector 110 comprises a float 112 and a weight 113, such that the deflector 110 is vertically aligned in the water. The float 112 and the weight 113 are connected to each other by means of one or more vanes 114, rotatably supported by the float 112 and the weight 113. The vanes 114 form wings, whereby the rotational position of the vanes 114 will control the lateral extension of the sensor carrier 100 relative the longitudinal axis L. The rotational position of each vane 114 may be controlled by means of an electrical motor (not shown), an hydraulic motor, etc. In other embodiments the vanes 114 are fixed.

The deflector 110 is preferably also provided with one or more wings 115 that extends out from the deflector 110 in a horizontal direction, around which the wing 115 is rotatable by means of e.g. an electrical motor (not shown), or manually before using the sea bed survey system. By controlling the rotational position of the wing 115 the deflector 110 will move up or down, i.e. towards or away from the sea bed 11. Accordingly the deflector 110 can be configured to operate as a depressor.

During operation of the sea bed survey system 10 the sensor carriers 100 are towed, and the deflectors 110 can be controlled for ensuring the desired lateral extension of the sensor carriers 100 by means of the vanes 114, as well as the distance from the sea bed 11 by means of the wing 115.

The deflector 110 thus forms means for controlling the altitude of the sensor carrier 100 above the sea bed, or depth of the sensor carrier 100 below the sea surface.

Figures 7, 8:
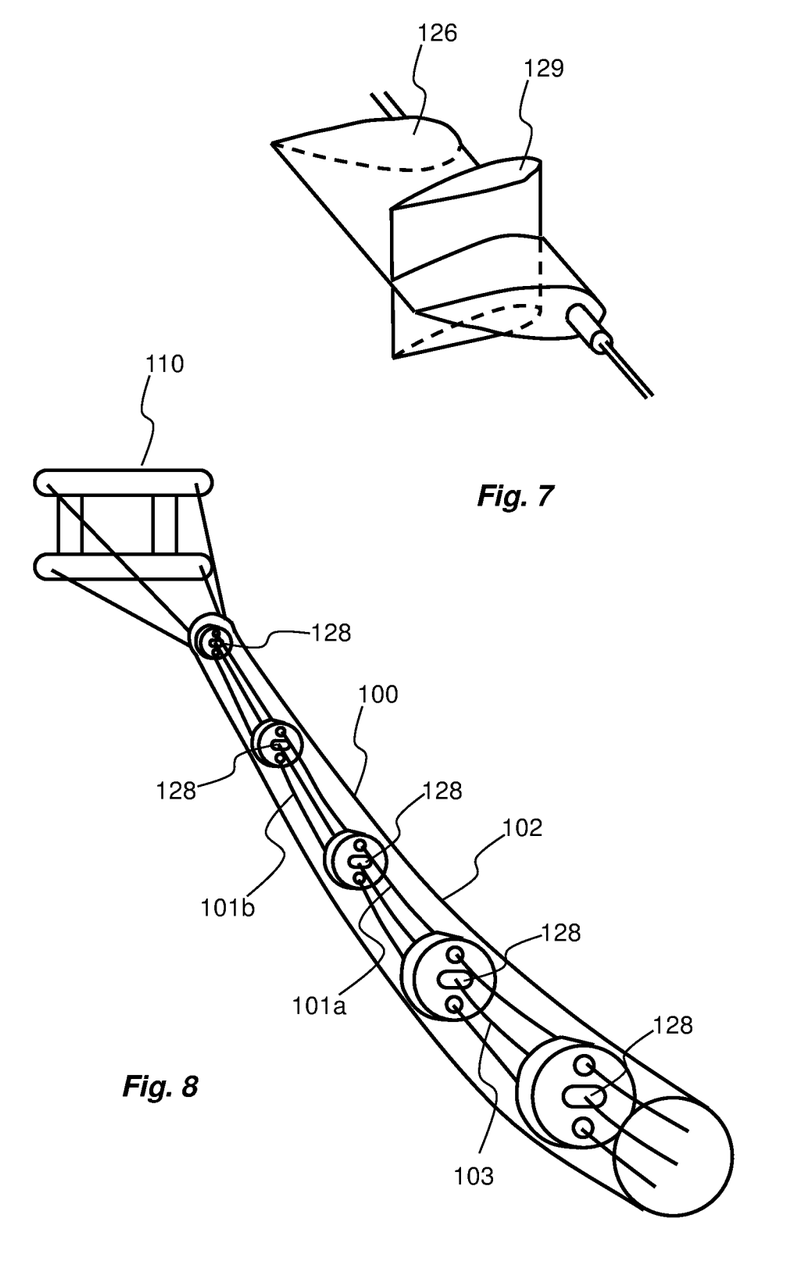
FIG. 7 is an isometric view of a part of a sensor carrier according to an embodiment.
FIG. 8 is a schematic view of a curved sensor carrier according to an embodiment.

Additional deflectors 110 may form the connections 122 between adjacent sections 120. In other embodiments, as shown in FIG. 7, the fairing arrangement 126 shown in FIG. 5 may at some locations along the sensor carrier 100 be provided with a vertically arranged wing 129 forming a deflecting surface for generating lateral forces on the sensor carrier 100. Consequently, the wings 129 are distributed in a plurality of locations along the sensor carrier 100, and the sensor carrier portion between two adjacent wings 129 may define a section 120.

The provision of additional deflectors 110 allows one or more locations of the sensor carrier 100 to be controlled to automatically maintain a constant vertical offset relative to a reference point of the system. Such automatic control may be accomplished by using depth information derived from water pressure sensors or by measuring the distance to sea surface using echo-sounding, or by measuring sensor carrier tilt angle relative to the horizontal plane using libels or accelerometers.

Vertical steering forces can also be generated altering the buoyancy of the deflectors 110 or the sensor carriers 100, for example by adjusting the amount of air inside the deflector float 112 or inside the sensor carrier 100.

The sensor carrier 100 connects with the towing cable 14 at a towing point. The sea bed survey system may comprise a winch configured to adjust the vertical distance between the towing body 12 and the towing point of the sensor carrier 100 for controlling the altitude or depth of the sensor carrier 100. The vertical position of the sensor carrier 100 may thus be controlled by adjusting the survey speed through the water.

An example of a sensor carrier 100 is shown in FIG. 8. The sensor carrier 100 extends between the rear deflector 110 and the front towing point, and several sensors 128 are distributed along the length of the sensor carrier 100. The sensors 128 are connected by means of the wire harness 103. Strain members 101 and the sensors 128 are embedded inside a hollow tube 102. The strain members 101 may comprise two ropes or wires 101a, 101b. Due to the fact that these strain members 101a, 101b are of the same length they will self orientate vertically, i.e. one wire 101a vertically above the other wire 101b, when the sensor carrier shape is curved due to towing forces and drag. The sensors 128 are preferably arranged inside rigid bodies, as is illustrated in FIG. 8, whereby the rigid bodies also form means for separating the strain members 101 from each other. As is evident, FIG. 8 is not to scale.

Sensor data is e.g. transmitted via the wire harness 103 to a data acquisition unit arranged somewhere on the sensor carrier 100, or via the wire harness 103 to a data processing unit installed onto the towing body 12.

Figure 9:
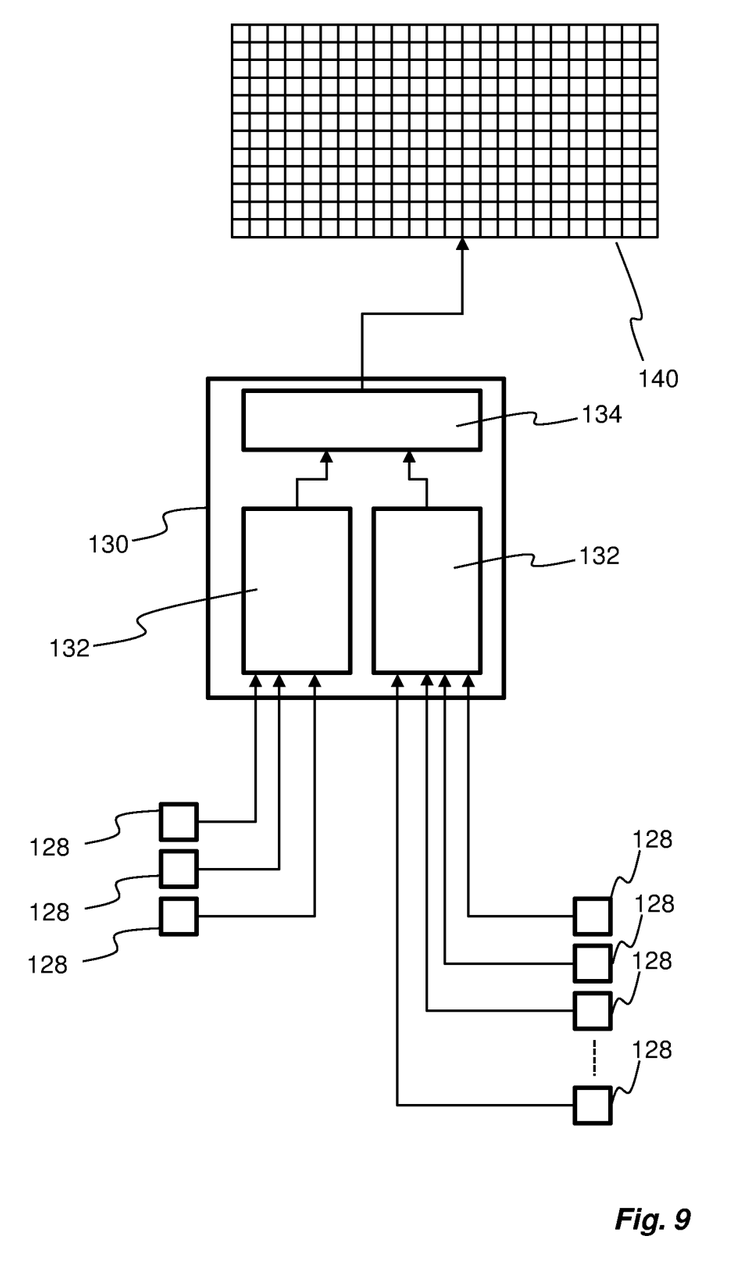
FIG. 9 is a control scheme of a sea bed survey system according to an embodiment.

Now turning to FIG. 9 a schematic view of the sea bed survey system 10 is shown. Except for the sensor carrier(s) 100, including the sensors 128, the sea bed survey system 10 may also comprise a data processing unit 130. The data processing unit 130 comprises a data acquisition module 132 configured to receive sensor data and position/attitude data. For this purpose the data acquisition module 132 is connected to the sensors 128, thus receiving sensor data such as the magnetic field to which each sensor 128 is exposed to. Additionally, the data acquisition module 132 receives data from the additional positioning sensors 128 (indicated as the sensors to the left in FIG. 9). This data, forming position data, is also received by the data acquisition module 132. Preferably, each sensor data also comprises information corresponding to the relative position of the sensor, e.g. with respect to the rear deflector 110 or with respect to its adjacent sensors.

The data processing unit 130 also comprises a mapping module 134 configured to associate a specific sensor data with a specific position based on the position data. Hence the mapping module 134 receives the sensor data, as well as position data. The mapping module 134 is further configured to provide a map of the sea bed, e.g. by creating a table 140 wherein each cell of one series of cells is filled with a value corresponding to the sensor data, e.g. sensed magnetic field. This method is commonly referred to as gridding acquired sensor data into a geo-referenced grid.

Data may be stored and presented in a GIS system (Geographical Information System).

Preferably, the mapping module 134 also receives data representing the speed and position of the towing body 12.

Sensor data is preferably filtered in time-domain and spatially filtered after gridding in order to enhance ability to detect field anomalies. Data from different sensors may be cross-correlated to further enhance ability to detect anomalies.

Filtering e.g. the magnetic field may for example be performed by configuring the data acquisition module 132 to receive the sensed magnetic field, and to compare adjacent sensor data, i.e. sensor data from other sensors, or previous sensor data from the same sensor, in order to identify a background level of the surrounding magnetic field. Any deviation from the background level, for example as compared to a predetermined threshold value, may indicate the presence of a metallic object in the proximity of the sensor 128.

The sampling rate of the sensors shall preferably be high enough to achieve at least the same resolution longitudinally as transversely.

Figure 10:
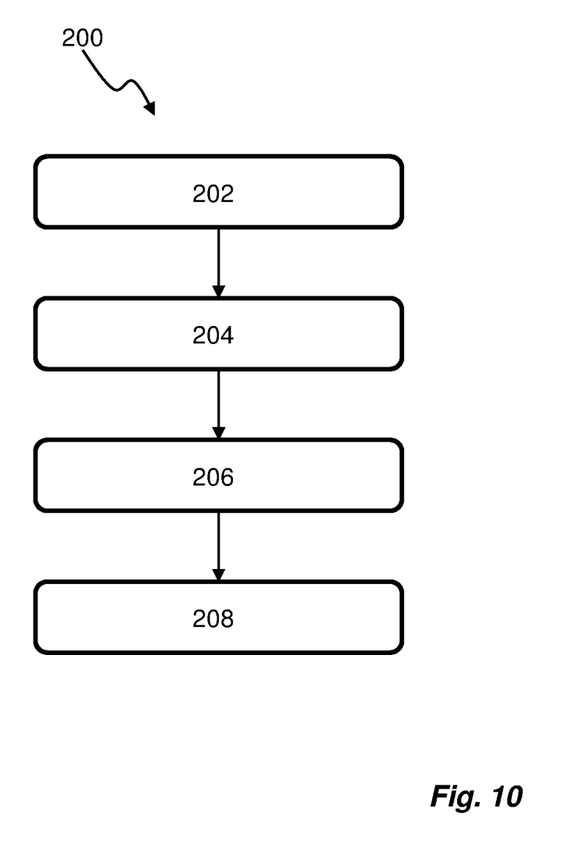
FIG. 10 is schematic view of a method according to an embodiment.

FIG. 10 shows a method 200 for sea bed surveying. The method 200 comprises a first step 202 of providing at least one sensor carrier, having a plurality of sensors distributed along its length and at least one deflector for controlling the position of the sensor carrier 100 relative the sea bed as well as relative a longitudinal axis coinciding with a survey direction. The method also comprises a step 204 of arranging said at least one sensor carrier 100 with a lateral extension relative said longitudinal axis, and a step 206 of controlling a data processing unit for receiving sensor data as well as position data. In a final step 208, the method provides a map of the sea bed by associating a specific sensor data with a specific position based on the position data.

Although the above description has been made mostly with reference to a system and method for mine detection, it should be readily understood that the general principle of the system and method is applicable for various different sub-surface operations, for which surveying of the sea bed is desired.

Further, the invention has mainly been described with reference to a few embodiments. However, as is readily understood by a person skilled in the art, other embodiments than the ones disclosed above are equally possible within the scope of the invention, as defined by the appended claims.

The invention claimed is:

1. A sea bed survey system configured to be towed by a towing body and configured to detect unexploded ordnances (UXO's) and other ferromagnetic man-made objects residing on a sea bed or being buried below the sea bed, the sea bed survey system comprising at least two sensor carriers which in combination define a V-shape, each sensor carrier having a plurality of sensors disposed along its length and at least one deflector configured to control the lateral extension between ends of the sensor carriers and to control the vertical position of said sensor carrier to a desired altitude above the sea bed, at least one of said sensors being a magnetic sensor which can detect a ferromagnetic signature of a present UXO or other man-made ferromagnetic object, wherein the lateral extension exceeds 25% of the length of sensor carrier, and the vertical height above the sea bed is less than the lateral extension of said sensor carrier.

2. The system according to claim 1, wherein at least one of the sensor carriers further comprises one or more acoustic transponders or acoustic responders for positioning the sensor carrier.

3. The system according to claim 1, further comprising at least one motion reference unit for determining the position of one or more points on the sensor carrier, and wherein the motion reference unit is selected from the group comprising: a combined inertial navigation sensor, accelerometers, rotating gyros, vibrational gyros, laser gyros, Doppler logs, and/or inclinometers.

4. The system according to claim 1, wherein one or more of the sensors of the sensor carrier are configured to provide data associated with the shape of the sensor carrier, whereby the respective position of the sensors in Geo-referenced coordinates is determined based on at least one known position in Geo-referenced coordinate, and the relative position of the sensor within the sensor carrier, and wherein the sensors providing data associated with the shape of the sensor carrier are selected from the group comprising heading sensors, depth sensors, inclinometers, or sensors measuring the curvature of the sensor carrier.

5. The system according to claim 1, further comprising a control unit configured to control the altitude above the sea bed of the sensor carrier at one or more locations along the length of the sensor carrier, whereby the control unit is further configured to apply vertical steering forces to the sensor carrier, and wherein the vertical steering forces are generated by at least one steerable rudder or by a change in buoyancy of the deflector.

6. The system according to claim 1, further comprising means for controlling the altitude of the sensor carrier above the sea bed, or depth of the sensor carrier below the sea surface, and wherein said means for controlling the altitude or depth of the sensor carrier comprises a winch configured to adjust the vertical distance between the towing body and a towing point on the sensor carrier.

7. The system according to claim 5, wherein the control unit is configured to allow one or more locations of the sensor carrier to be controlled to automatically maintain a constant vertical offset relative to a reference point of the system, using depth information derived from water pressure sensors or by measuring the distance to sea surface using echo-sounding, or by measuring sensor carrier tilt angle relative to the horizontal plane using libels or accelerometers.

8. The system according to claim 1, wherein said deflector is arranged at a first end of the sensor carrier being opposite the towing point arranged at a second end of the sensor carrier, and wherein the second end of the sensor carrier is towed directly or indirectly by said towing body.

9. The system according to claim 1, further comprising means for applying lateral forces directly or indirectly to one or more locations on the sensor carrier, thus enabling horizontal steering.

10. The system according to claim 1, further comprising at least one electrode configured to transmit an electrical current through the surrounding water and bottom substrata, wherein said at least one electrode is mounted directly or indirectly onto the sensor carrier and/or the towing cable and/or the towing body.

11. The system according to claim 1, wherein said sensors are configured to measure magnetic field in vector form, or the absolute magnitude of the magnetic field, or its gradients in one or more axes, and/or wherein said sensors are configured to measure acoustic pressure, acoustic particle velocity, or particle acceleration, and/or wherein said sensors are electrodes measuring electrical-field or its gradients, and/or wherein said sensors are temperature sensors, and/or wherein said sensors are chemical sensors, and/or wherein said sensors comprises active sensors transmitting electromagnetic energy, light, or acoustic energy, and/or measuring returned energy or time-of-flight, and/or wherein said sensors are selected from the group comprising multibeam echosounders, single beam echosounders, acoustic sidescanners, sub bottom profilers, boomers, sparkers, laser range finders, laser scanners, cameras, and/or systems measuring resistivity, and/or wherein said sensors comprises tilt sensors configured to measure tilt in two or more axes for determining changes in other non-tilt sensors orientation relative to the gravitational vector, thus allowing for compensation of pre-determined or adaptively determined errors in other non-tilt sensor output or in other non-tilt sensor derived signals, and/or wherein said sensors comprises a plurality of cameras, and a plurality of light sources arranged at a distance from the cameras, for improving visibility in turbid water, and/or wherein said sensors are connected to optical fibers for transmitting measured data in order to reduce EMC problems resulting in cross-feed into sensors, and/or wherein said sensors are optical fiber sensors in order to reduce EMC problems resulting in cross-feed into sensors.

12. The system according to claim 1, wherein electrical power and signals are distributed in balanced pairs using galvanic isolation in order to reduce EMC problems resulting in cross-feed into sensors, and in particular reducing magnetic fields, and/or wherein electrical power and signals are distributed using frequencies outside the bandwidth of the used sensors, for the purpose of reducing cross-feed into sensor signals, caused by electrically self-generated noise within the system.

13. A sea bed survey system configured to be towed by a towing body and configured to detect unexploded ordnances (UXO's) and other ferromagnetic man-made objects residing on a sea bed or being buried below the sea bed, the sea bed survey system comprising at least two sensor carriers which in combination define a V-shape, each sensor carrier having a plurality of sensors disposed along its length and at least one deflector at a rear of the sensor carriers, said rear deflectors being configured to control the lateral extension between ends of the sensor carriers and the vertical position of the sensor carriers to a desired altitude above the sea bed, at least one of said sensors being a magnetic sensor which can detect a ferromagnetic signature of a present UXO or other man-made ferromagnetic object, and
    a control unit configured to receive sensor data as well as position data and to associate specific sensor data with a specific position of the sea bed.

14. The system according to claim 13, wherein said sensors comprise magnetic sensors, such as 3-axis fluxgate sensors.

15. The system according to claim 13, wherein each sensor carrier is divided into two or more sections, each section comprises a plurality of sensors, and wherein each section is further provided with at least one water pressure sensor configured to provide depth information and/or at least one echo-sounding sensor configured to measure the distance to sea surface.

16. The system according to claim 13, wherein at least two sensor carriers extend in a plane being substantially parallel with the sea bed, and wherein one of said sensor carriers extends on one side of a longitudinal axis coinciding with a survey direction, and the other one of said sensor carriers extends on the opposite side of the longitudinal axis such that the two sensor carriers form a V-shape.

17. The system according to claim 16, wherein the two sensor carriers are connected at a connection point.

18. The system according to claim 17, wherein said connection point is formed by a deflector, enabling lateral and vertical steering, or by a depressor allowing only vertical steering.

19. A sea bed survey method, comprising the steps of:
    towing at least two sensor carriers by means of a towing body, said sensor carriers in combination defining a V-shape, wherein each sensor carrier has a plurality of sensors disposed along its length, and wherein at least one of said plurality of sensors is a magnetic sensor which can detect a ferromagnetic signature of a present unexploded ordnances (UXO's) or other man-made ferromagnetic object, and
    deflecting the lateral extension and the vertical position of said sensor carrier such that the lateral extension exceeds 25% of the length of sensor carrier, and the vertical position above the sea bed is less than the lateral extension of said sensor carrier; and wherein the vertical extension is at an altitude above the sea bed such that the magnetic sensor of the sensor carriers can detect a ferromagnetic signature of a present UXO or other man-made ferromagnetic object.

20. A sea bed survey method, comprising the steps of:
    providing at least two sensor carriers which in combination define a V-shape, each sensor carrier having a plurality of sensors, including at least one magnetic sensor, distributed along its length and at least one deflector configured to control the position of a back end of the sensor carrier to an altitude above the sea bed such that the at least one magnetic sensor of the sensor carrier can detect a ferromagnetic signature of a present unexploded ordnances (UXO's) or other man-made ferromagnetic objects and relative to a longitudinal axis coinciding with a survey direction, arranging said at least one sensor carrier such that the sensor carrier has a lateral extension relative the survey direction, and controlling at least one control unit for receiving sensor data as well as position data, and associating a specific sensor data with a specific position of the sea bed.

\* \* \* \* \*